(12) United States Patent
Pal et al.

(10) Patent No.: US 7,340,386 B2
(45) Date of Patent: Mar. 4, 2008

(54) METHOD AND SYSTEM FOR QUANTIFYING THE QUALITY OF DIAGNOSTIC SOFTWARE

(75) Inventors: Rahul Pal, Santa Clara, CA (US); Kumar Vadhri, San Jose, CA (US); Gulam Dastagir, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 274 days.

(21) Appl. No.: 11/138,734

(22) Filed: May 26, 2005

(65) Prior Publication Data

US 2006/0271822 A1 Nov. 30, 2006

(51) Int. Cl.
*G06F 17/50* (2006.01)

(52) U.S. Cl. .............................. 703/14; 703/13; 703/14; 703/15; 703/20; 716/1; 716/4; 716/5

(58) Field of Classification Search .................. 703/14; 716/1, 4, 5
See application file for complete search history.

(56) References Cited

U.S. PATENT DOCUMENTS

| | | | |
|---|---|---|---|
| 6,175,946 B1 * | 1/2001 | Ly et al. .......................... | 716/4 |
| 6,230,114 B1 | 5/2001 | Hellestrand et al. | |
| 6,321,186 B1 * | 11/2001 | Yuan et al. ..................... | 703/15 |
| 2003/0093256 A1 * | 5/2003 | Cavanagh et al. ............. | 703/14 |

* cited by examiner

*Primary Examiner*—Paul Rodriguez
*Assistant Examiner*—Jonathan Teets
(74) *Attorney, Agent, or Firm*—Trellis Intellectual Property Law Group, PC

(57) ABSTRACT

A method, a system, and an apparatus for quantification of the quality of diagnostic software by applying a coverage tool are provided, wherein the diagnostic software is used for testing a computing system. The method involves executing the diagnostic software in an Integrated Circuit (IC) verification environment. The diagnostic software is executed by a Virtual Computer-processing Unit (V-CPU), which models (Central Processing Unit) CPU of the computing system to be tested.

20 Claims, 3 Drawing Sheets

METHOD AND SYSTEM FOR QUANTIFYING THE QUALITY OF DIAGNOSTIC SOFTWARE

BACKGROUND OF THE INVENTION

1. Field of Invention

Embodiments of the present invention relate in general to computing system manufacturing processes. More specifically, the embodiments of the present invention relate to methods and systems for quantifying the quality of diagnostic software used in testing computing systems.

2. Description of the Background Art

Diagnostic software is used for testing a newly manufactured computing system, and runs on the Central Processing Unit (CPU) of the computing system being tested. The diagnostic software includes a set of diagnostic tests targeting individual Integrated Circuits (ICs) present in the computing system, as well as whole computing system. The diagnostic tests provide different inputs to the ICs. The outputs of these inputs are then compared with expected output values. Once the computing system is tested, it is loaded with software; after which it undergoes alpha and beta testing before being finally released to customers.

The quality of the computing system depends on the quality of the diagnostic software. Therefore, the percentage of the design of the computing system that is covered by the diagnostic software is very important. Currently, there are no tools available that can quantify the quality of diagnostic tests and determine the amount of hardware coverage provided by the diagnostic software.

DETAILED DESCRIPTION OF EMBODIMENTS OF THE INVENTION

Figure 1:
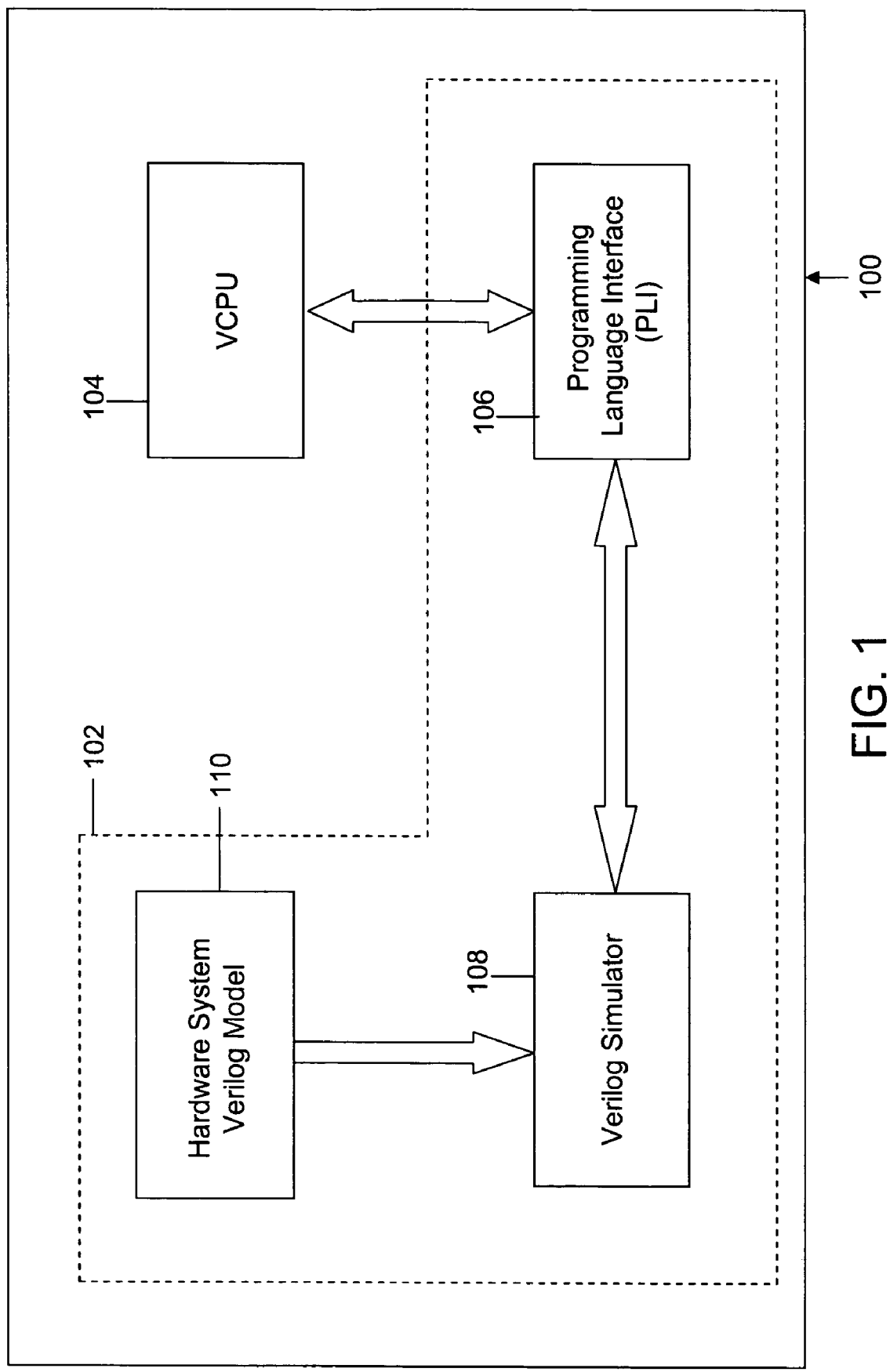
FIG. 1 illustrates a hardware-software-co-simulation environment, in accordance with an exemplary embodiment of the present invention.

Various embodiments of the present invention provide a method and system for quantification of quality of diagnostic software used for testing a computing system by applying a coverage tool. Computing systems include Integrated Circuits (ICs). ICs can be broadly classified as Application Specific Integrated Circuits (ASICs) and Field Programmable Gate Arrays (FPGAs). The diagnostic software runs on the Central Processing Unit (CPU) of the computing system being tested.

The diagnostic software includes a set of diagnostic tests, targeting individual ICs present in the computing system, as well as the whole computing system. The diagnostic tests provide different inputs to the ICs. The outputs of these inputs are then compared with expected output values. In various embodiments of the present invention, the method involves executing the diagnostic software in an IC verification environment. The IC verification environment supports coverage tools that can provide coverage for the diagnostic software.

An IC is usually designed by creating an IC specification that describes the functions of the IC. The design is thereafter reduced to a Hardware Description Language (HDL), such as Verilog or Very High-speed integrated circuit Hardware Description Language (VHDL), at a level of abstraction known as the Registered Transfer Level (RTL). This involves coding IC design into a hardware module. The hardware module is then verified by a verification process.

The process of verification requires a software platform, which includes the behavioral models of all other ICs, the IC interacts with at a system level. The software platform is referred to as a test-bench. The test bench is then stimulated by a list of tests, referred to as test cases. The test cases produce different combinations of test inputs the IC sees in a real-world application. The hardware module has input and output ports; the input ports take test inputs from the test cases, and the output ports provide responses to the test inputs.

A software tool converts the hardware module and test bench code into an executable file. Examples of such software tools include, but not limited to, the Verilog Code Simulator (VCS) version 7.1.1 from Synopsys Inc. To generate the executable file, the software tool requires at least three sets of inputs. These inputs are a set of IC design files having the IC design code, which specifies the functionality of the IC; a test case that describes a specific feature of the IC design that is to be verified and a set of test bench files. The test bench code is linked to the kernel of a VCS or any other simulator via a public GNU Compiler Collection (GCC). This results in the generation of an executable file, which can simulate the behavior of the hardware module, as specified in the test case.

The quality of the test cases used in the verification process is quantified, to calculate the percentage of the hardware module covered by the test cases. This is done by using a coverage tool. The coverage tool provides information regarding the percentage of the hardware module covered by each test case, in the form of coverage metric. The coverage metrics for each test case are then cumulated to calculate the coverage metric for the entire IC design code. This cumulative metric helps in identifying the features, lines, or blocks of the IC design code that are not covered by any of the test cases, used to test the hardware module. Examples of the coverage tool include, but not limited to, CoverMeter from Synopsys Inc. and HDLScore. These tools are capable of providing coverage metrics when the IC design code is written in hardware description languages like Verilog or VHDL and the test bench is written using hardware verification languages like Vera, System Verilog or Verilog.

FIG. 1 illustrates a hardware-software-co-simulation environment 100, in accordance with an exemplary embodiment of the present invention. Hardware-software-co-simulation environment 100 includes an IC verification environment 102, a Virtual-Central Processing Unit (V-CPU) 104, a Verilog-Programmable Language Interface (PLI) 106, a verification simulator for example Verilog simulator 108. Environment 100 further includes a hardware system model, for example hardware system Verilog model 110 (modeling the computing system) that is to be verified. In various embodiments of the invention, hardware system Verilog model 110 includes the bus and the corresponding bus interface, as well as the memory and corresponding memory interface associated with the computing system. Hardware system model together with V-CPU 104 constitutes a computing system model.

IC verification environment 102 supports coverage tools, which provide coverage for the diagnostic software. Hardware-software-co-simulation environment 100 enables the execution of the diagnostic software in IC verification environment 102. In various embodiments of the invention, executing software on a CPU in a verification environment is referred to as hardware-software-co-simulation. V-CPU 104 can be a product from Summit Design Inc. In various embodiments of the present invention, V-CPU 104 includes a Bus Functional Model (BFM) and a virtual processor running on a workstation.

In an embodiment of the present invention, V-CPU 104 models the CPU in the computing system. It supports execution of the diagnostic software and translation of access to hardware system Verilog model 110 by the diagnostic software into UNIX socket messages to Verilog-PLI 106. V-CPU 104 is a tool that runs on workstation.

In an embodiment of the present invention, V-CPU 104 executes the diagnostic software in IC verification environment 102. This allows the diagnostic software to provide input to hardware system Verilog model 110 and receive output for the given input.

Verilog-PLI 106 provides a UNIX socket interface between V-CPU 104 and Verilog simulator 108. In an embodiment of the invention, Verilog-PLI 106 is written in C language and uses the Verilog-PLI library. Verilog-PLI 106 is linked to the kernel of Verilog simulator 108.

In various embodiments of the invention, hardware system Verilog model 110 is accessed through Verilog-PLI 106 by using a socket communication. In various embodiments of the present invention, a handshake between the software side of the simulation and the hardware side of the simulation can be automated, to carry out the diagnostic tests with minimum human intervention. In various embodiments of the present invention, callbacks are provided on the software as well as the hardware side, to facilitate the handshake.

Figure 2:
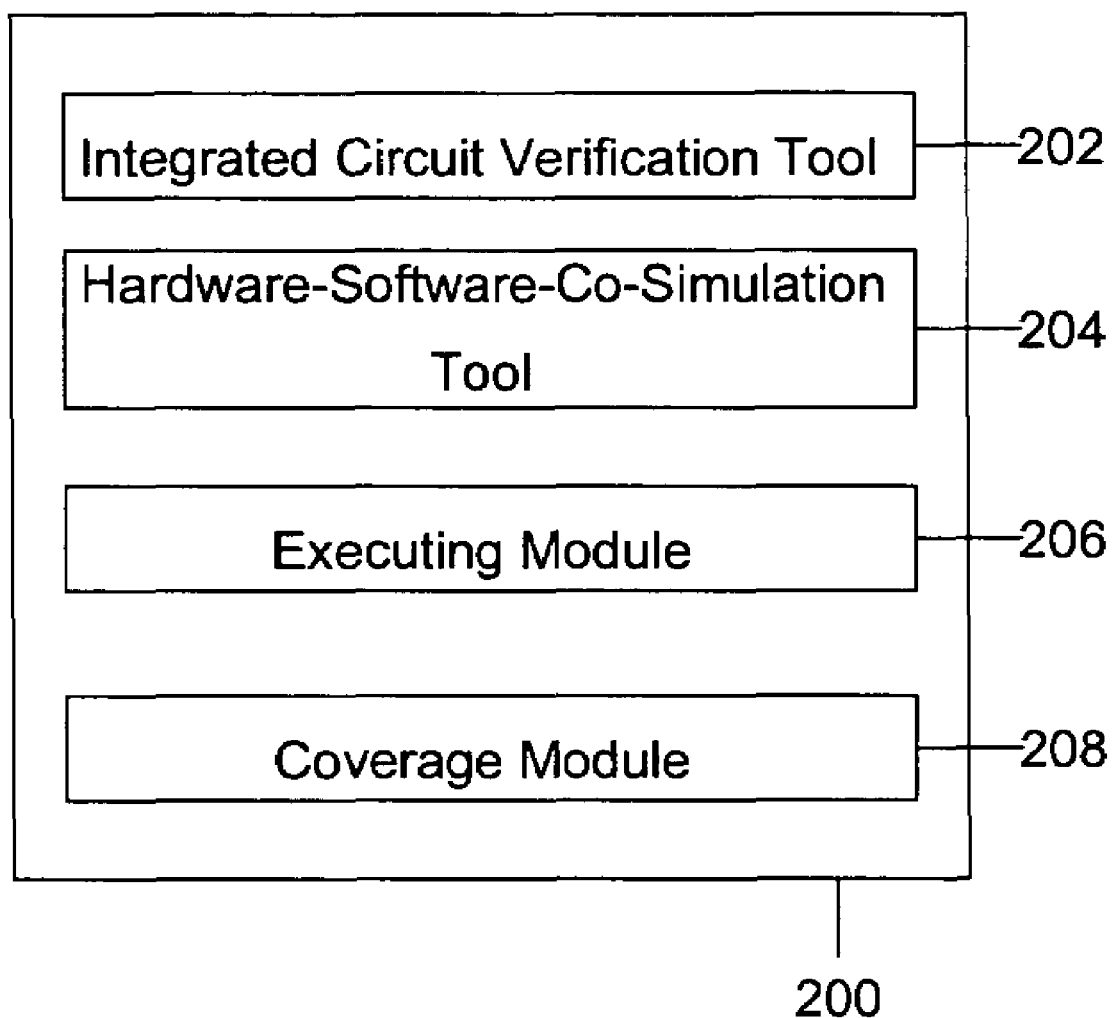
FIG. 2 illustrates a system for quantifying the quality of diagnostic software used for testing a computing system by applying a coverage tool, in accordance with an exemplary embodiment of the present invention.

FIG. 2 illustrates a system 200 for quantifying the quality of diagnostic software used for testing hardware system Verilog model 110, by applying a coverage tool, in accordance with an exemplary embodiment of the present invention. System 200 includes an IC verification tool 202, a hardware-software-co-simulation tool 204, an executing module 206, and a coverage module 208. In various embodiments of the present invention, each element of system 200 is implemented as software.

IC verification tool 202 generates IC verification environment 102. Exemplary IC verification tool 202 includes, but not limited to, Verilog simulator 108. Hardware-software-co-simulation tool 204 generates hardware-software-co-simulation environment 100. Exemplary hardware-software-co-simulation tool 204 includes, but not limited to, V-CPU and those provided by Seamless/CVE provided by Mentor Graphics. Executing module 206 executes the diagnostic software in IC verification environment 102. Execution of the diagnostic software involves conducting diagnostic tests on hardware system Verilog model 110.

Coverage module 208 runs a coverage tool on hardware system Verilog model 110 and observes hardware system Verilog model 110. Hardware system Verilog model 110 executes as a response to the input provided by individual diagnostic tests. The coverage metrics for each diagnostic test is collected and cumulated. The cumulative metric is analyzed with pre-set coverage expectations. In an embodiment of the present invention, the cumulative metric is compared with coverage metrics achieved by carrying out hardware tests, to calculate the percentage of hardware system Verilog model 110, covered by the diagnostic software.

In an embodiment of the present invention, the coverage tool is built into Verilog simulator 108. The coverage tool being tightly integrated into Verilog simulator 108 offers performance advantages and is also less cumbersome. In an embodiment of the present invention, it is possible to turn the coverage on and off on specific sub-modules of hardware system Verilog model 110. In an embodiment of the present invention, diagnostic tests are grouped vis-à-vis the submodule of hardware system Verilog model 110 a particular diagnostic test is focusing on. In an embodiment of the present invention, the process of turning the coverage on or off can be automated, depending on the group of diagnostic tests being carried out. In an embodiment of the present invention, the coverage tool is built into the same environment along with V-CPU 104.

Figure 3:
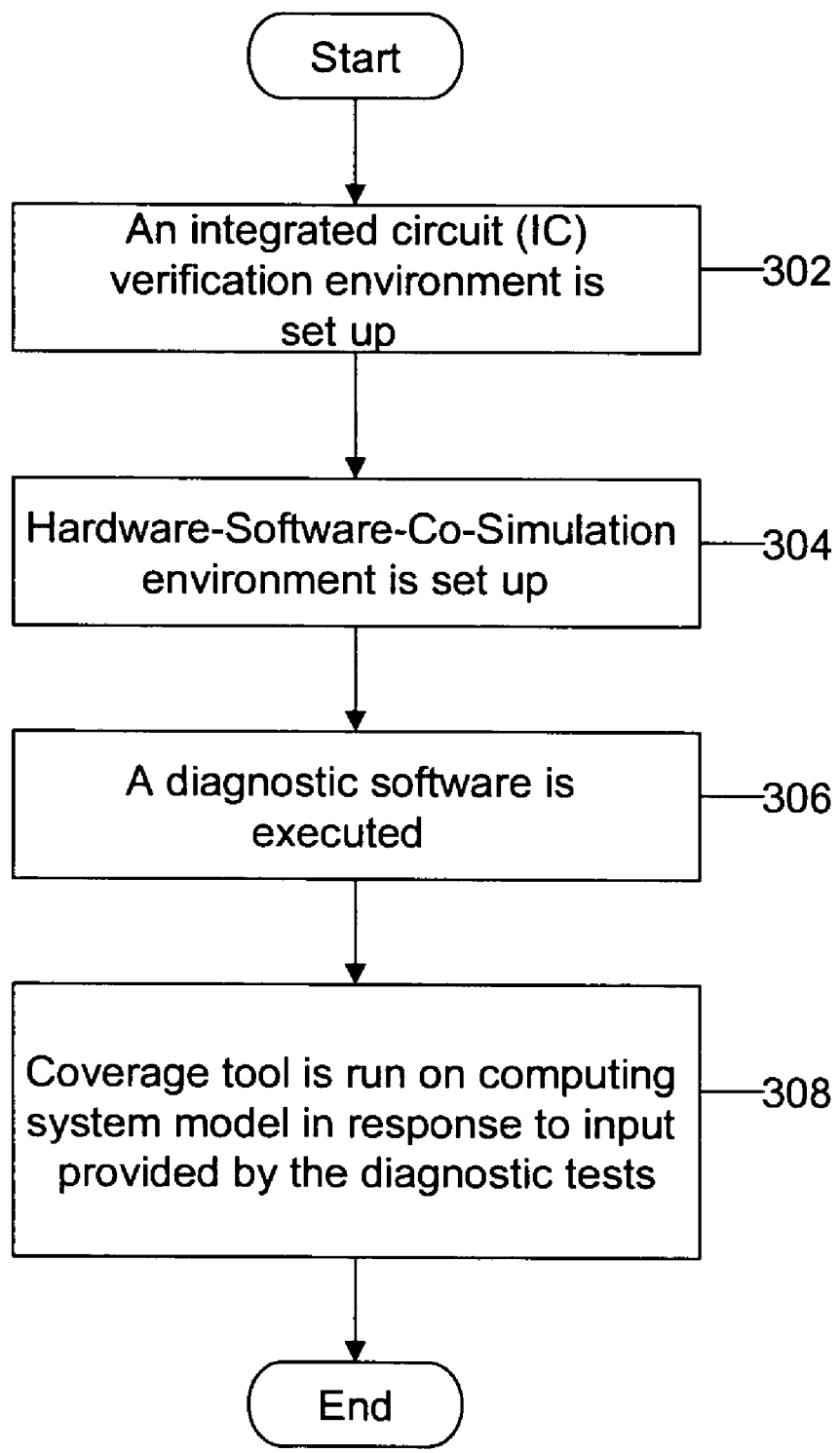
FIG. 3 is a flowchart depicting the requisite steps in a method for quantifying the quality of diagnostic software used for testing a computing system by applying a coverage tool, in accordance with an exemplary embodiment of the present invention.

FIG. 3 is a flowchart depicting the requisite steps in a method for quantifying the quality of diagnostic software, used for testing a computing system by applying a coverage tool, in accordance with an exemplary embodiment of the present invention. As described earlier, the computing system is modeled by the computing system model that includes the hardware system model and the V-CPU. In an embodiment the hardware system model is a hardware system Verilog model. The computing system is in the form of a hardware module.

At step 302, an IC verification environment is set up. At step 304, a hardware-software-co-simulation environment is set up. Setting up the hardware-software-co-simulation environment uses a tool such as V-CPU, which models the CPU associated with the computing system.

At step 306, the V-CPU executes the diagnostic software. Execution of the diagnostic software involves conducting diagnostic tests on the computing system model. The computing system has input and output ports. Each diagnostic test provides a different kind of input to the input ports of the computing system model. In various embodiments of the invention, execution of the diagnostic software involves conducting diagnostic tests on the hardware system model.

At step 308, the coverage tool is run on the hardware system model. The hardware system model executes as a response to the input provided by individual diagnostic tests. This results in generation of a coverage metric for each diagnostic test. The coverage metrics for each diagnostic test are collected and cumulated. The cumulative metric is analyzed with pre-set coverage expectations. This provides the percentage of the hardware system model covered by the diagnostic software.

To summarize, the embodiments of the invention provide implementation of the coverage of the diagnostic tests, provided by the diagnostic software in a co-simulation environment. This is the same software that is used to bring-up the hardware in the design lab as well as to run tests on the manufacturing floor.

Embodiments of the present invention have the advantage that they enable the quantification of the diagnostic software in an IC verification environment. This IC verification environment is comprehensive and quantification of diagnostic software in it helps in achieving the same level of thoroughness in the development of the diagnostic software as in the development of IC verification tests.

The hardware-software co-simulation environment facilitates the execution of the diagnostic tests on an actual IC design code. This not only saves time and effort but is also economical, since diagnostic test developers do not have to wait for the final device to be ready, to debug diagnostic tests.

FGPA design cycles are much smaller, as compared to the ASIC design cycle. Therefore, in conventional techniques, there is not enough time to verify the FPGA design thoroughly before the actual hardware arrives. The method described in various embodiments of the present invention facilitates quicker verification of the FPGA device.

Also, FPGA development is iterative, which means that the design is changed as and when bugs are found on the real board. In conventional techniques, running a verification suite to verify that any FPGA bug-fix is not breaking other parts of the design, takes a long time. The method described in various embodiments of the present invention can be used to verify whether FPGA bug fixes do not break the existing functionality.

The embodiments of the invention can also enable subcontracting of diagnostic software development to third-party design services companies, since the services of third-party companies can be quantified. This can result in a reduction in the cost of developing a hardware product.

Although the invention has been discussed with respect to specific embodiments thereof, these embodiments are merely illustrative, and not restrictive, of the invention. For example, a 'method for quantifying the quality of diagnostic software, used for testing a computing system by applying a coverage tool' can include any type of analysis, manual or automatic, to anticipate the needs of quantification of the quality of the diagnostic software.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain, store, communicate, propagate, or transport the computer program for use by or in connection with the instruction execution system apparatus, system or device. The computer readable medium can be, by way of example only but not by limitation, an electronic, magnetic, optical, electromagnetic, infrared, or semiconductor system, apparatus, system, device, propagation medium, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for quantifying a quality of a diagnostic software used for testing a computing system, the method comprising:
    setting up an Integrated Circuit (IC) verification environment;
    setting up a hardware-software-co-simulation environment in the IC verification environment using a Virtual-Central Processing Unit (V-CPU) that models a CPU associated with the computing system;
    executing the diagnostic software in the hardware-software-co-simulation environment to generate test inputs to a computing system model, wherein the computing system model comprises a hardware system model and the V-CPU; and
    running a coverage tool on the computing system model that executes in response to the test inputs to calculate a percentage of the computing system model covered by the test inputs.

2. The method of claim 1, wherein the executing of the diagnostic software occurs on the V-CPU.

3. The method of claim 1, wherein the V-CPU comprises a Bus Functional Model (BFM) and a virtual processor running on a workstation.

4. The method of claim 2, wherein the executing the diagnostic software further comprises using a verification tool.

5. The method of claim 4, wherein the setting up the hardware-software-co-simulation environment further comprises using a UNIX socket interface having a Verilog-Programmable Language Interface (PLI) layer, the Verilog-PLI layer being linked to the IC verification tool.

6. The method of claim 5, further comprising integrating the coverage tool into the IC verification tool.

7. The method of claim 2, further comprising translating accesses to the hardware system model by the executing of the diagnostic software into UNIX socket messages to Verilog-PLI.

8. A system for quantifying a quality of a diagnostic software used for testing a computing system, comprising:
    means for verifying an Integrated Circuit (IC) in an IC verification environment;
    means for using a Virtual-Central Processing Unit (V-CPU), which models a CPU associated with the computing system, in a hardware-software-co-simulation environment in the IC verification environment;
    means for executing the diagnostic software in the hardware-software-co-simulation environment to generate test inputs to a computing system model, wherein the computing system model comprises a hardware system model and the V-CPU; and
    means for running a coverage tool on the computing system model that executes in response to the test inputs to calculate a percentage of the computing system covered by the test inputs.

9. A system for quantifying a quality of a diagnostic software used for testing a computing system, the system for quantifying comprising:
    an Integrated Circuit (IC) verification tool configured to generate an IC verification environment;
    a hardware-software-co-simulation tool comprising a Virtual-Central Processing Unit (V-CPU) that models a CPU associated with the computing system, the hardware-software-co-simulation tool being configured to generate a hardware-software-co-simulation environment in the IC verification environment; and
    logic encoded in one or more tangible media for execution, and when executed operable to:
        execute the diagnostic software in the hardware-software-co-simulation environment to generate test inputs to a computing system model, wherein the computing system model comprises a hardware system model and the V-CPU; and
        run a coverage tool on the computing system model that executes in response to test inputs to calculate a percentage of the computing system model covered by the test inputs.

10. The system of claim 9, wherein the V-CPU is configured to execute the diagnostic software.

11. The system of claim 9, wherein the V-CPU comprises a Bus Functional Model (BFM) and a virtual processor running on a workstation.

12. The system of claim 9, further comprising a UNIX socket interface between the V-CPU and the IC verification tool.

13. The system of claim 12, wherein the UNIX socket interface is provided by a Verilog-Programmable Language Interface (PLI) layer, the Verilog-PLI layer being linked to the IC verification tool.

14. The system of claim 13, wherein the coverage tool is integrated into the IC verification tool.

15. The system of claim 10, wherein the V-CPU is configured to translate accesses to the hardware system model by the executed diagnostic software into UNIX socket messages to Verilog-PLI.

16. A computer-readable storage device including instructions for quantifying a quality of a diagnostic software used for testing a computing system, the computer-readable storage device comprising:

one or more instructions for setting up an Integrated Circuit (IC) verification environment;

one or more instructions for setting up a hardware-software-co-simulation environment in the IC verification environment using a Virtual-Central Processing Unit (V-CPU) that models a CPU associated with the computing system;

one or more instructions for executing the diagnostic software in the hardware-software-co-simulation environment to generate test inputs to a computing system model, wherein the computing system model comprises a hardware system model and the V-CPU; and one or more instructions for running a coverage tool on the computing system model that executes in response to the test inputs to calculate a percentage of the computing system model covered by the test inputs.

17. An apparatus configured to quantify a quality of a diagnostic software used for testing a computing system, the apparatus comprising:

a processing system including a processor coupled to a display and user input device; and a computer-readable storage device, comprising:

one or more instructions for setting up an Integrated Circuit (IC) verification environment;

one or more instructions for setting up a hardware-software-co-simulation environment in the IC verification environment using a Virtual-Central Processing Unit (V-CPU) that models a CPU associated with the computing system;

one or more instructions for executing the diagnostic software in the hardware-software-co-simulation environment to generate test inputs to a computing system model, wherein the computing system model comprises a hardware system model and the V-CPU; and one or more instructions for running a coverage tool on the computing system model that executes in response to the test inputs to calculate a percentage of the computing system model covered by the test inputs.

18. The method of claim 1, wherein the running the coverage tool comprises determining a coverage metric related to features, lines, or blocks of IC design code not covered by any of the test inputs.

19. The method of claim 18, further comprising collecting the coverage metrics to form a cumulative coverage metric.

20. The method of claim 19, further comprising comparing the cumulative coverage metric against a predetermined value to calculate the percentage.

* * * * *